US009532277B2

United States Patent
Xu et al.

(10) Patent No.: US 9,532,277 B2
(45) Date of Patent: Dec. 27, 2016

(54) METHOD AND APPARATUS FOR DETERMINING SOURCE SGSN

(71) Applicant: Huawei Technologies Co., Ltd., Shenzhen, Guangdong (CN)

(72) Inventors: Xiaoying Xu, Shanghai (CN); Dong Chen, Shanghai (CN); Liwei Qiu, Shanghai (CN); Xiaobo Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 180 days.

(21) Appl. No.: 14/466,049

(22) Filed: Aug. 22, 2014

(65) Prior Publication Data

US 2014/0362827 A1 Dec. 11, 2014

Related U.S. Application Data

(63) Continuation of application No. PCT/CN2012/084659, filed on Nov. 15, 2012.

(30) Foreign Application Priority Data

Feb. 24, 2012 (CN) .......................... 2012 1 0044488
Sep. 13, 2012 (CN) .......................... 2012 1 0337796

(51) Int. Cl.
*H04W 36/00* (2009.01)
*H04W 8/06* (2009.01)
(Continued)

(52) U.S. Cl.
CPC ........... *H04W 36/0055* (2013.01); *H04W 8/02* (2013.01); *H04W 8/06* (2013.01); *H04W 36/0022* (2013.01); *H04W 60/005* (2013.01)

(58) Field of Classification Search
CPC .......... H04B 2203/5441; H04W 36/14; H04W 76/026; H04W 76/025; H04N 21/1422; H04L 45/22; H04L 45/24; H04L 45/28; H04L 12/5692
See application file for complete search history.

(56) References Cited

U.S. PATENT DOCUMENTS

2006/0234709 A1* 10/2006 Marinescu .............. H04L 45/00
455/436
2006/0256749 A1 11/2006 Rexhepi et al.
(Continued)

FOREIGN PATENT DOCUMENTS

CN 1852567 A 10/2006
CN 1925672 A 3/2007
(Continued)

OTHER PUBLICATIONS

"3rd Generation Partnership Project; Technical Specification Group Core Network and Terminals; Mobile radio interface Layer 3 specification; Core network protocols; Stage 3 (Release 11)", 3GPP TS 24.008 v11.12, Jan. 2012, 653 pages.
(Continued)

Primary Examiner — Dung B Huynh (57) ABSTRACT

Embodiments of the present invention provide a method and an apparatus for determining a source SGSN. The method for determining a source SGSN includes: obtaining addressing information of a source SGSN through a NAS message sent by a UE; and sending the addressing information of the source SGSN to a target MME or a target SGSN, so that the target MME or the target SGSN determines the source SGSN according to the addressing information of the source SGSN. The embodiments of the present invention may ensure that an MSC obtains latest addressing information of a source SGSN of a UE, so that a target MME or a target SGSN obtains prepare bearer information of the UE from a correct source SGSN.

8 Claims, 4 Drawing Sheets

(51) Int. Cl.
*H04W 8/02* (2009.01)
*H04W 60/00* (2009.01)

(56) References Cited

U.S. PATENT DOCUMENTS

| | | | |
|---|---|---|---|
| 2010/0215018 A1* | 8/2010 | Ejzak | H04W 36/0022 370/331 |
| 2010/0285801 A1* | 11/2010 | Pudney | H04W 60/00 455/435.1 |
| 2011/0002327 A1* | 1/2011 | Dwyer | H04W 48/18 370/352 |
| 2012/0264451 A1* | 10/2012 | Kim | H04L 41/06 455/456.1 |
| 2012/0282937 A1* | 11/2012 | He | H04W 8/26 455/450 |
| 2013/0010752 A1* | 1/2013 | Rydnell | H04W 36/0011 370/331 |
| 2013/0053028 A1* | 2/2013 | Vedrine | H04W 36/0022 455/432.1 |
| 2013/0142168 A1* | 6/2013 | Vedrine | H04W 36/0022 370/331 |

FOREIGN PATENT DOCUMENTS

| | | |
|---|---|---|
| CN | 101026564 A | 8/2007 |
| CN | 101039523 A | 9/2007 |
| CN | 101083830 A | 12/2007 |
| CN | 101212789 A | 7/2008 |

OTHER PUBLICATIONS

"3rd Generation Partnership Project; Technical Specification Group Services Aspects; Single Radio Voice Call Continuity (SRVCC); Stage 2 (Release 11)", 3GPP TS 23.216 v11.3.2, Dec. 2011, 59 pages.

"3rd Generation Partnership Project; Technical Specification Group Core Network and Terminals; Numbering, addressing and identification (Release 10)", 3GPP TS 23.003 v10.4.0, Dec. 2011, 81 pages.

"Overview of Single Radio Voice Cell Continuity from UTRAN/GERAN to E-UTRAN/HSPA", Huawei, 3GPP TSG-RAN WG3 #73bis, Oct. 10-14, 2011, 4 pages.

"3rd Generation Partnership Project; Technical Specification Group Services Aspects; Single Radio Voice Call Continuity (SRVCC); Stage 2 (Release 11)", 3GPP TS 23.216 v11.6.0, Sep. 2012, 67 pages.

"3rd Generation Partnership Project; Technical Specification Group Services and System Aspects; Feasibility Study of Single Radio Voice Call Continuity (SRVCC) from UTRAN/GERAN to E-UTRAN/HSPA; Stage 2 (Release 11)", 3GPP TS 23.885 v11.0.0, Sep. 2011, 83 pages.

"Possible solutions on notification of SGSN information", Huawei, 3GPP TSG-RAN WG3 #75bis, Mar. 26-30, 2012, 5 pages.

* cited by examiner

METHOD AND APPARATUS FOR DETERMINING SOURCE SGSN

CROSS-REFERENCE TO RELATED APPLICATIONS

This application is a continuation of International Application No. PCT/CN2012/084659, filed on Nov. 15, 2012, which claims priority to Chinese Patent Application No. 201210044488.9, filed on Feb. 24, 2012 and Chinese Patent Application No. 201210337796.0, filed on Sep. 13, 2012, all of which are hereby incorporated by reference in their entireties.

TECHNICAL FIELD

Embodiments of the present invention relate to a communication field, and in particular, to a method and an apparatus for determining a source general packet radio service (GPRS, General Packet Radio Service) serving support node (SGSN, Serving GPRS Support Node).

BACKGROUND

In the prior art, a user equipment (User Equipment, UE) reports a network resource identifier (Network Resource Identifier, NRI) to a radio network controller (Radio Network Controller, RNC) in an initial direct transfer message which is used for sending a routing area update (Routing Area Update, RAU) request message; then, the RNC reports a routing area identifier (Routing Area Identifier, RAI) and the NRI to a mobile switching center (Mobile Switching Center, MSC); and finally, the MSC sends them to a target mobility management entity (Mobility Management Entity, MME) or a target SGSN, so that the target MME or the target SGSN determines, according to the RAI and the NRI, a source SGSN where the UE is located, and obtains a context of the UE from the source SGSN.

When the RNC initiates a reverse single radio voice continuity (Reverse Single Radio Voice Call Continuity, SRVCC) handover (in other word, a handover from a circuit switched domain (Circuit Switched Domain, CS domain) to a packet switched domain (Packet Switched Domain, PS domain), normally the RAI and NRI reported by the UE are sent to the MSC in a relocation required (Relocation Required) message. In the reverse SRVCC handover process, the target MME or the target SGSN obtains the context of the UE from the SGSN where the UE is located.

Generally, addressing information of an SGSN may use an RAI FQDN structure, e.g., <NRI>.<RAC>.<LAC>.<MNC>.<MCC>.3gppnetwork.org. Evidently, the addressing information includes RAI, NRI, and the like, so that the target MME or the target SGSN may be connected, by using the above addressing information, to the source SGSN where the UE is located. The RAI consists of a mobile country code (Mobile Country Code, MCC), a mobile network code (Mobile Network Code, MNC), a location area code (Location Area Code, LAC), and a routing area code (Routing Area Code, RAC).

However, after a UE initiates a CS call (such as a voice call), if the UE supports a reverse SRVCC handover, the UE will initiates an RAU process when an RNC initiates a reverse SRVCC handover, so that the RNC may obtain an NRI of the UE from an initial direct transfer message (such as an RAU request message), and ensure that an RAI of the UE and an RAI of a cell where the UE is located are consistent. When the RNC initiates the reverse SRVCC handover, the RAI and the NRI are carried in a relocation required message and are sent to an MSC, and then the MSC sends them to a target MME or a target SGSN. When the RNC fails to be connected to a source SGSN, the RNC will select another SGSN; therefore, the NRI reported by the UE is invalid. If the UE is in a CS connected state, after a inter-RNC handover of the UE, the UE initiates an RAU process after the handover, and sends an RAU request message through an uplink direct transfer (Direct Transfer) message, thereby ensuring an RAI of the UE and an RAI of a cell where the UE is located are consistent. However, the uplink direct transfer message does not include an NRI. When an SGSN where the UE is located is changed, the RNC still cannot obtain addressing information of a new source SGSN.

Or if a UE is in a PS connected state, after a inter-SGSN handover of the UE, if an RAI is changed, under the circumstances that the RNC does not inform the UE of a new RAI, the RNC cannot obtain an RAI of a source SGSN where the UE is located after the handover. Even if the RNC notifies the RAI change to the UE, because the RAI is changed, the UE will initiate an RAU process after receiving the notification, so that the UE obtains a new RAI. However, when the SGSN where the UE is located is changed, the UE uses an UPLINK DIRECT TRANSFER message to send an RAU request, where the message does not carry an NRI. Even if an NRI is carried, it is also possible that the RNC cannot select an SGSN indicated by the NRI, that is, the NRI is changed. Therefore, the RNC still cannot obtain addressing information of a new source SGSN.

SUMMARY

Embodiments of the present invention provide a method and an apparatus for determining a source SGSN, which are capable of solving the problem how a target MME or a target SGSN determines a source SGSN when an SGSN where a UE is located is changed.

In one aspect, a method for determining a source SGSN is provided, including: obtaining addressing information of a source SGSN through a non-access stratum (Non Access Stratum) NAS message sent by a UE; and sending the addressing information of the source SGSN to a target MME or a target SGSN, so that the target MME or the target SGSN determines the source SGSN according to the addressing information of the source SGSN.

In another aspect, a method for determining a source SGSN is provided, including: obtaining addressing information of a source SGSN from an RNC; and sending the addressing information of the source SGSN to a target MME or a target SGSN, so that the target MME or the target SGSN determines the source SGSN according to the addressing information of the source SGSN.

In still another aspect, a method for determining a source SGSN is provided, including: obtaining addressing information of a source SGSN; and sending the addressing information of the source SGSN to an MSC through a NAS message, or sending the addressing information of the source SGSN to an RNC through a direct transfer message or a cell update message.

In yet still another aspect, a method for determining a source SGSN is provided, including: receiving addressing information of a source SGSN; and sending the addressing information of the source SGSN to an MSC.

In one aspect, an apparatus for determining a source SGSN is provided, including at least one processor and a communication interface, the communication interface is connected with one of the at least one processor, wherein the at least one processor, configured to obtain addressing information of a source SGSN through a NAS message sent by a UE; and a sending unit, configured to send the addressing information of the source SGSN to a target MME or a target SGSN, so that the target MME or the target SGSN determines the source SGSN according to the addressing information of the source SGSN.

In another aspect, an apparatus for determining a source SGSN is provided, including: a second obtaining unit, configured to obtain addressing information of a source SGSN from an RNC; and a sending unit, configured to send the addressing information of the source SGSN to a target MME or a target SGSN, so that the target MME or the target SGSN determines the source SGSN according to the addressing information of the source SGSN.

In still another aspect, an apparatus for determining a source SGSN is provided, including: a processor, configured to obtain addressing information of a source SGSN; and a sender, configured to send the addressing information of the source SGSN to an MSC through a NAS message, or send the addressing information of the source SGSN to an RNC through a direct transfer message or a cell update message.

In yet still another aspect, an apparatus for determining a source SGSN is provided, including: a second receiving unit, configured to receive addressing information of a source SGSN; and a third sending unit, configured to send the addressing information of the source SGSN to an MSC.

The embodiments of the present invention may ensure that a target MME or a target SGSN determines a source SGSN when an SGSN where a UE is located is changed.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

The technical solutions of the present invention may be applied to various communication systems, such as GSM, code division multiple access (CDMA, Code Division Multiple Access), wideband code division multiple access (WCDMA, Wideband Code Division Multiple Access Wireless), general packet radio service (GPRS, General Packet Radio Service), long term evolution (LTE, Long Term Evolution), and the like.

A user equipment (UE, User Equipment), which may also be referred to as a mobile terminal (Mobile Terminal), a mobile user equipment, and the like, may communicate with one or more core networks through a radio access network (for example, RAN, Radio Access Network). The user equipment may be a mobile terminal, such as a mobile phone (which may also be referred to as a "cell" phone), a computer having a mobile terminal, for example, a portable, pocket-sized, handheld, computer built-in, or vehicle-mounted mobile device, which exchanges voice and/or data with a radio access network.

A base station may be a base station (BTS, Base Transceiver Station) in GSM or CDMA, a base station (NodeB) in WCDMA, or an evolved base station (eNB, or e-NodeB, evolutional Node B) in LTE, which is not limited in the present invention. However, for the convenience of description, the following embodiments are described by using a Node B as an example.

A method for determining a source SGSN according to embodiments of the present invention is described in the following with reference to the accompanying drawings. Addressing information of a source SGSN mentioned in the following may be at least one: an NRI (or a packet temporary mobile subscriber identity (Packet-Temporary Mobile Subscriber Identity, P-TMSI), an RAI (or an RAC), a global core network identity (Global CN-ID), or an Internet Protocol (Internet Protocol, IP) address of a source SGSN in a core network (Core Network, CN).

A source SGSN refers to an SGSN where a context of a UE is located. For example, after a inter-SGSN handover, a target SGSN becomes a source SGSN of a UE. The target SGSN normally is a target SGSN for a handover, and in this case, addressing information of a source SGSN stored on the UE is still addressing information of a source SGSN before the handover.

Figure 1:
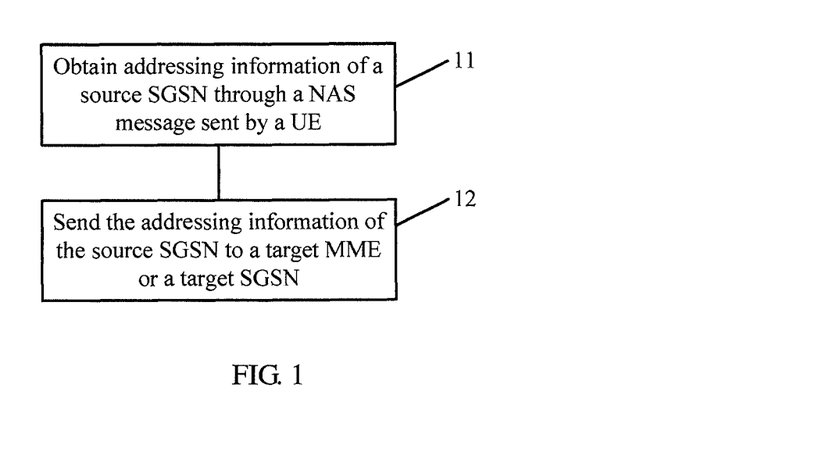
FIG. 1 is a flowchart of a method for determining a source SGSN according to an embodiment of the present invention.

In FIG. 1, a method for determining a source SGSN on an MSC side according to an embodiment of the present invention may be described as follows.

11. An MSC obtains addressing information of a source SGSN through a NAS message sent by a UE.

Generally, in a CS call setup process, after a CS call is set up, or after an SGSN is changed after movement, a UE may actively report addressing information of a source SGSN.

In this case, the UE may send the addressing information of the source SGSN where the UE is located in carried in a NAS message to an MSC. For example, a message such as a service request (Service Request) may be used to carry the addressing information of the source SGSN to the MSC.

Because the UE can always obtain the addressing information of the source SGSN where it is located, it is considered that after a UE is moved, in other word, in cases that an SGSN where the UE is located is changed, the UE actively reports the addressing information of the source SGSN where the UE is located directly to the MSC through a NAS message, and the MSC sends the addressing information of the source SGSN to a target MME or a target SGSN. When the MSC receives only an RAC, the MSC may use an LAI of a CS domain and the RAC to form an RAI, and then send the RAI together with an NRI (or a P-TMSI) to the target MME or the target SGSN. Further, the UE may determine that the SGSN is changed according to one or more of a P-TMSI change, an NRI change, and an RAI change.

Optionally, before obtaining the addressing information of the source SGSN through the NAS message sent by the UE, the MSC may also request the UE to report the addressing information of the source SGSN.

Normally, after the MSC receives a reverse SRVCC handover request or an SRVCC preparation handover request, or in a CS call setup process, or after a CS call is set up, or after an SGSN handover occurs, the MSC may actively obtain addressing information of the source SGSN from the UE.

For example, when an RNC initiates a reverse SRVCC handover, that is, when an MSC receives a reverse SRVCC handover request sent by the RNC, or when an MSC receives a reverse handover preparation request sent by the RNC, or before the RNC initiates an reverse SRVCC handover (including in a CS call setup process, after a CS call is set up, or after a handover occurs), the MSC sends an SGSN information report request to a UE, thereby requesting the UE to actively report addressing information of an SGSN where the UE is located to the MSC through a NAS message.

12. The MSC sends the addressing information of the source SGSN to a target MME or a target SGSN, so that the target MME or the target SGSN determines the source SGSN according to the addressing information of the source SGSN.

Based on the above description, the method for determining a source SGSN according to an embodiment of the present invention may ensure that an MSC obtains latest addressing information of a source SGSN of a UE, so that a target MME or a target SGSN obtains prepare bearer information of the UE from a correct source SGSN.

A manner how an MSC obtains addressing information of a source SGSN directly from a UE is described above. The following further analyzes a manner how an MSC obtains addressing information of a source SGSN from an RNC with reference to 2 scenarios. Addressing information obtained by an RNC may only be an NRI or a P-TMSI, or an NRI (or a P-TMSI) and an RAI (or an RAC). The RNC needs to obtain addressing information of a source SGSN where voice bearer information of a UE is located, and then informs an MSC of the addressing information; upon receipt, the MSC stores or updates the addressing information of the source SGSN, and informs an MME of the addressing information, so that the MME may obtain a PDP context from the source SGSN.

Figure 2:
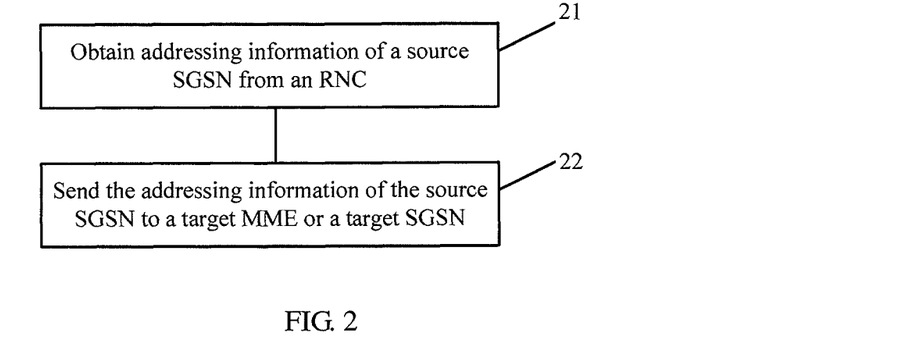
FIG. 2 is a flowchart of a method for determining a source SGSN according to an embodiment of the present invention.

As shown in FIG. 2, a method for determining a source SGSN on an MSC side according to an embodiment of the present invention may be described as follows.

21. An MSC obtains addressing information of a source SGSN from an RNC.

That is, the RNC obtains the addressing information of the source SGSN first, and then the MSC receives the addressing information of the source SGSN sent by the RNC.

The RNC obtains the addressing information of the source SGSN in the following manners: the RNC receives addressing information of a target SGSN carried in a relocation request message sent by the target SGSN in a relocation process; the RNC receives addressing information of a source SGSN carried in a common identity (Common ID) or a direct transfer message sent by the source SGSN; or the RNC receives the addressing information of the source SGSN carried in an uplink direct transfer message or a cell update message sent by a UE; or the RNC obtains the addressing information of the source SGSN from a local SGSN information table after the RNC and the SGSN establish a signaling connection for a UE; or a UE sends the addressing information of the source SGSN carried in an initial direct transfer message. The initial direct transfer message specifically further allows, besides carrying addressing information of a core network of a CS domain, carrying addressing information of an SGSN of a PS domain.

Specifically, the RNC, when initiating a reverse SRVCC handover, sends the addressing information of the source SGSN carried in a relocation required (Relocation Required) message to the MSC. Alternatively, the RNC, when receiving addressing information of an initial SGSN sent by a UE, obtains addressing information of an SGSN to which a current context of the UE belongs from the SGSN after the handover, or obtains addressing information of a current SGSN from the SGSN after the RNC and the SGSN establish a connection for a UE, and then immediately sends the addressing information to the MSC.

22. The MSC sends the addressing information of the source SGSN to a target MME or a target SGSN, so that the target MME or the target SGSN determines the source SGSN according to the addressing information of the source SGSN.

Based on the above description, the method for determining a source SGSN according to an embodiment of the present invention may ensure that an MSC obtains latest addressing information of a source SGSN of a UE, so that a target MME or a target SGSN obtains prepare bearer information of the UE from a correct source SGSN.

Scenario 1: A UE Initiates a CS Call

A UE sends a NAS message to a network through an initial direct transfer message or an uplink direct transfer message. In this case, addressing information of a source SGSN where the UE is located is carried in the initial direct transfer or the uplink direct transfer RRC message.

For example, when a UE initiates a CS call, the UE sends a NAS message through an initial direct transfer message to an RNC; or after a UE sets up a CS call, the UE sends a NAS message through an uplink direct transfer message to an RNC. Addressing information of a source SGSN where the UE is located is carried in an access stratum (Access Stratum, AS) message (such as an initial direct transfer or an uplink direct transfer RRC message) bearing a NAS message.

For example, after a UE sets up a CS call, when the UE and a source SGSN establish a signaling connection, the source SGSN carries addressing information of the source SGSN in a radio access network application part (Radio Access Network Application Part, RANAP) message such as a downlink direct transfer message or a common identity. The UE may establish the signaling connection with the source SGSN by initiating an RAU request, or an attach (Attach) request, or a packet data protocol (Packet Data Protocol, PDP) activation request, and the like. It should be noted that if it is unnecessary for the UE to initiate a NAS message after setting up the CS call, the UE may be forced to initiate an RAU process.

Scenario 2: A UE Moves, and an RAU Process or RNC Relocation Occurs

After a UE sets up a CS call, the UE is in a PS idle state; when a inter-RNC handover occurs on the UE, a source RNC may transfer addressing information of a source SGSN to a target RNC in a handover process. For example, the addressing information may be sent to the target RNC carried in an enhanced handover request message or a source RNC to target RNC transparent container. After the handover, if an SGSN of the UE is not changed, the RNC continues to use the source RNC to send the obtained addressing information of the source SGSN.

If, after the inter-RNC handover, the UE initiates an RAU process, the UE sends an RAU request to the target RNC through an initial direct transfer message; the target RNC sends the RAU request through an uplink direct transfer message; a target SGSN, upon receipt of an initial UE message provided by the target RNC, sends addressing information of a SGSN to the target RNC through a common identity. Then, the source SGSN successfully obtains a context of the UE from a source SGSN before the handover, and sends an RAU accept message to the UE. The source SGSN may send the addressing information of the source SGSN to the target RNC in an RANAP downlink direct transfer message which sends the RAU accept (accept); or the source SGSN sends the addressing information of the source SGSN to the target RNC through a downlink direct transfer message after determining that RAU is complete; or after the target RNC and the source SGSN establish a connection for the UE, the target RNC obtains the addressing information of the source SGSN from a local SGSN information table. The target RNC performs updating by using the addressing information of the source SGSN.

Optionally, after a handover, the UE is forced to initiate an RAU process, so that the RNC establishes a connection with an SGSN which may be changed, thereby enabling the source SGSN after the change to deliver addressing information to the target RNC.

The UE, after receiving the downlink direct transfer message of RAU accept from the target RNC, sends RAU process completion to the source SGSN through an uplink direct transfer message, and may carry addressing information of the new source SGSN in the uplink direct transfer message, so that the RNC carries the addressing information to an MSC in a relocation required message.

Scenario 2: A Inter-SGSN Handover Occurs on a UE

If a UE is in a PS connected state, and if a inter-SGSN handover occurs, a target RNC obtains latest addressing information from a target SGSN after the handover. In other word, the target SGSN delivers latest addressing information of a source SGSN to the target RNC through an RANAP message such as a relocation required message or a direct transfer message. Specifically, the target SGSN delivers the latest addressing information of the SGSN to the target RNC through a relocation required message in the handover process, or the SGSN delivers the latest addressing information of the source SGSN to the target RNC through a direct transfer message after the handover process.

Scenario 3: A UE Initiates a Cell Update Process

When a UE reselects a cell, a cell update process is triggered after the cell reselection. Information about a source SGSN is carried by the UE in a cell update message, received by a target RNC and sent to a source RNC (serving RNC), and then sent by the source RNC to an MSC in a handover request. In this case, it is unnecessary for the MSC to initiate a process of obtaining the information about the source SGSN from the UE. The information about the source SGSN received from the source RNC is directly used. The information about the source SGSN is carried for a target PS core network node in a reverse handover request handover message, and a subsequent reverse handover process is continued.

Optionally, the UE, when it is determined that reverse SRVCC handover capability is supported or it is possible that a reverse handover may be initiated or after a radio link fails, carries information about the source SGSN in the cell update message. Further, the UE determines that a CS voice is in use before the cell update.

Optionally, the information about the source SGSN is carried in the handover request message when the source RNC determines to initiate a reverse handover.

A scenario for triggering cell reselection is performing cell reselection after a radio link failure occurs or in a cell forward access channel CELL_FACH state.

By using the method of the scenario 3, the problem that an MSC cannot request a UE to send addressing information of a source SGSN through a NAS message in a reverse handover process triggered by the UE in cell update may be solved. Because before a cell update acknowledgment is received, a signaling bearer bearing a NAS message is not set up, no NAS message can be received.

By using the above method, after the RNC obtains the latest addressing information of the source SGSN, the RNC informs the MSC of the addressing information.

For example, the RNC may, when initiating a reverse SRVCC handover, send the latest addressing information of the source SGSN carried in a relocation required message to the MSC. For another example, when the RNC receives addressing information of an initial source SGSN sent by the UE or after obtaining the latest addressing information of the source SGSN of the UE from the new source SGSN, the RNC sends the latest addressing information of the source SGSN carried in a direct transfer message to the MSC.

The addressing information sent by the RNC to the MSC may be information obtained by performing combination processing or extraction on information received from an SGSN or a UE and local information.

The MSC, when receiving the latest addressing information of the source SGSN sent by the RNC, updates to the latest addressing information of the source SGSN.

Based on the above description, a method for determining a source SGSN on a UE side and on an RNC side according to embodiments of the present invention may be summarized.

Figure 3:
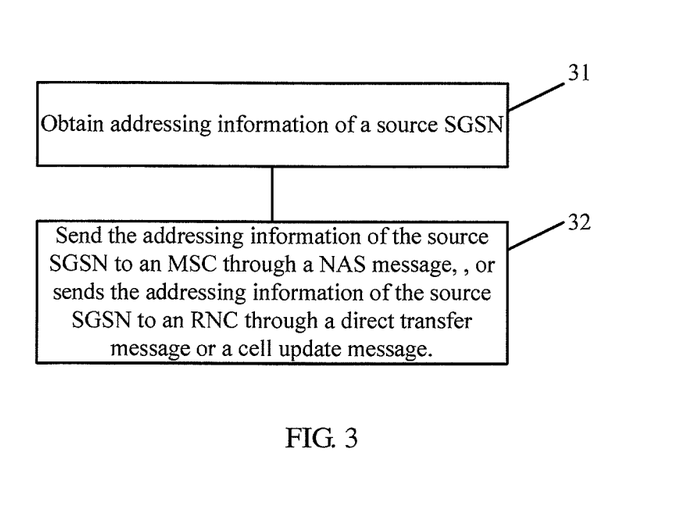
FIG. 3 is a flowchart of a method for determining a source SGSN according to an embodiment of the present invention.

In FIG. 3, a method for determining a source SGSN on a UE side according to an embodiment of the present invention is described as follows.

31. A UE obtains addressing information of a source SGSN.

Optionally, before obtaining the addressing information of the source SGSN, the UE receives a report request sent by an MSC for sending the addressing information of the source SGSN.

32. The UE sends the addressing information of the source SGSN to an MSC through a NAS message, or sends the addressing information of the source SGSN to an RNC through a direct transfer message or a cell update message.

Figure 4:
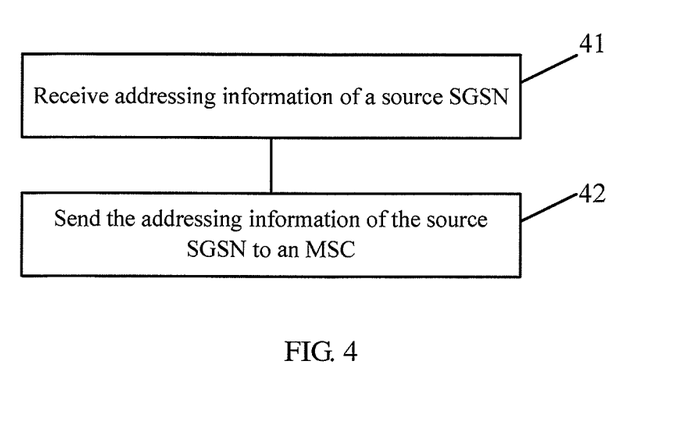
FIG. 4 is a flowchart of a method for determining a source SGSN according to an embodiment of the present invention.

In FIG. 4, a method for determining a source SGSN on an RNC side according to an embodiment of the present invention includes the following steps.

41. An RNC obtains addressing information of a source SGSN.

Specifically, a target RNC receives addressing information of a target SGSN carried in a relocation required message sent by the target SGSN in a relocation process; or receives the addressing information of the source SGSN carried in a common identity or a direct transfer message sent by a target SGSN; or receives the addressing information of the source SGSN carried in a direct transfer message or a cell update message sent by a UE.

When a cell update message triggers a inter-RNC relocation process, the target RNC sends an uplink signaling transfer indication message to a source RNC, thereby forwarding the received cell update message to the source RNC. The source RNC, when determining to initiate a reverse handover, puts the received addressing information of the source SGSN in a relocation required message to send the relocation required message to the MSC. Optionally, the target RNC extracts, after receiving the cell update message, the addressing information of the source SGSN, and sends the addressing information of the source SGSN to the source RNC in an uplink signaling transfer indication message.

42. The RNC sends the addressing information of the source SGSN to an MSC.

For example, the RNC sends the addressing information of the source SGSN to the MSC through a relocation required message or a direct transfer message Based on the above description, the method for determining a source SGSN according to an embodiment of the present invention may ensure that an MSC obtains latest addressing information of a source SGSN of a UE, so that a target MME or a target SGSN obtains prepare bearer information of the UE from a correct source SGSN.

The solution for an MSC to obtain addressing information of a source SGSN from a UE and the solution of obtaining the addressing information from an RNC may be used together. For example, a UE reports addressing information of a source SGSN to an MSC through a NAS message first; after an SGSN to which the UE belongs is changed, the UE or the RNC then reports addressing information of an SGSN after the change to the MSC.

An apparatus for determining a source SGSN according to embodiments of the present invention is described in the following with reference to FIG. 5 to FIG. 8.

Figure 5:
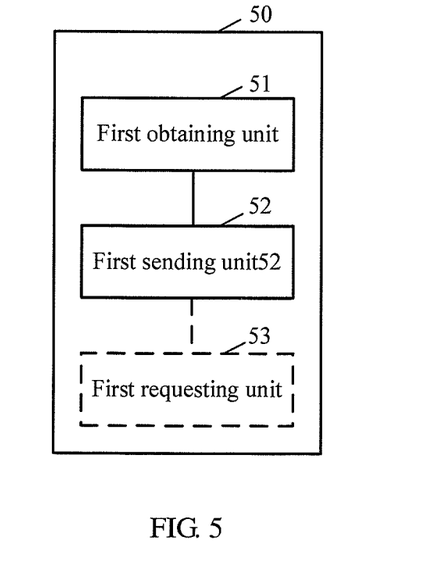
FIG. 5 is a schematic structural diagram of an apparatus for determining a source SGSN according to an embodiment of the present invention.

As shown in FIG. 5, an apparatus 50 for determining a source SGSN includes a first obtaining unit 51 and a first sending unit 52. The first obtaining unit 51 is configured to obtain addressing information of a source SGSN through a NAS message sent by a UE. The first sending unit 52 is configured to send the addressing information of the source SGSN to a target MME or a target SGSN, so that the target MME or the target SGSN determines the source SGSN according to the addressing information of the source SGSN.

Optionally, the apparatus 50 for determining a source SGSN may further include a first requesting unit 53, which is configured to request, before the addressing information of the source SGSN is obtained through the NAS message sent by the UE, the UE to send the addressing information of the source SGSN.

Figure 6:
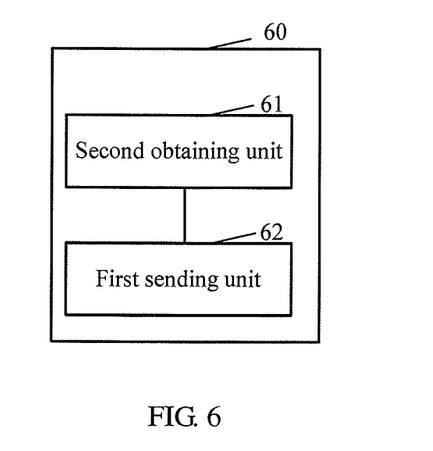
FIG. 6 is a schematic structural diagram of an apparatus for determining a source SGSN according to an embodiment of the present invention.

As shown in FIG. 6, an apparatus 60 for determining a source SGSN includes a second obtaining unit 61 and a first sending unit 62. The second obtaining unit 61 is configured to obtain addressing information of a source SGSN from an RNC. Further, the second obtaining unit 61 may be configured to receive the addressing information of the source SGSN carried in a relocation required message or a direct transfer message sent by the RNC. The first sending unit 62 is configured to send the addressing information of the source SGSN to a target MME or a target SGSN, so that the target MME or the target SGSN determines the source SGSN according to the addressing information of the source SGSN.

Figure 7:
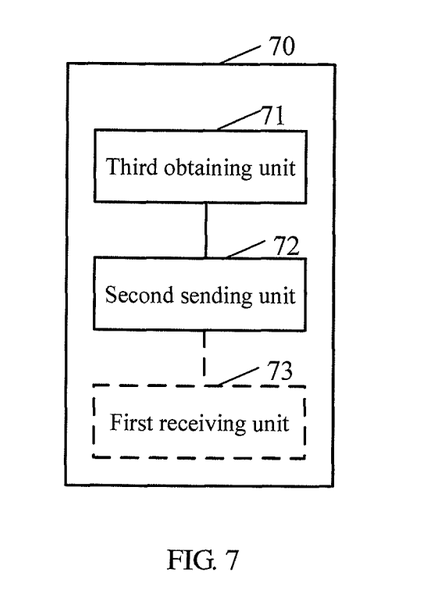
FIG. 7 is a schematic structural diagram of an apparatus for determining a source SGSN according to an embodiment of the present invention.

As shown in FIG. 7, an apparatus 70 for determining a source SGSN includes a third obtaining unit 71 and a second sending unit 72. The third obtaining unit 71 is configured to obtain addressing information of a source SGSN. The second sending unit 72 is configured to send the addressing information of the source SGSN to an MSC through a NAS message, or send the addressing information of the source SGSN to an RNC through a direct transfer message or a cell update message.

Optionally, the apparatus 70 for determining a source SGSN may further include a first receiving unit 73, configured to receive, before the addressing information of the source SGSN is obtained, a report request sent by the MSC for sending the addressing information of the source SGSN.

Figure 8:
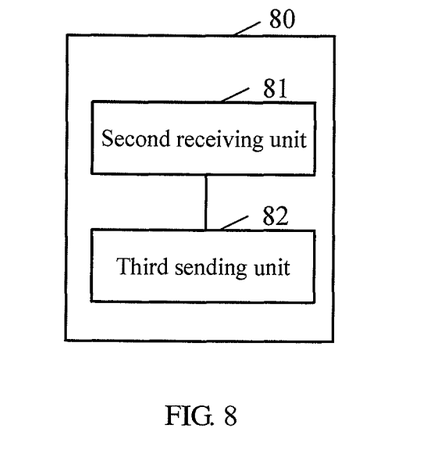
FIG. 8 is a schematic structural diagram of an apparatus for determining a source SGSN according to an embodiment of the present invention.

As shown in FIG. 8, an apparatus 80 for determining a source SGSN includes a second receiving unit 81 and a third sending unit 82. The second receiving unit 81 is configured to receive addressing information of a source SGSN. Further, the second receiving unit 81 may be configured to receive addressing information of a target SGSN carried in a relocation required message sent by the target SGSN in a relocation process; receive the addressing information of the source SGSN carried in a common identity or a direct transfer message sent by a source SGSN; or receive the addressing information of the source SGSN carried in a direct transfer message or a cell update message sent by a UE.

The third sending unit 82 is configured to send the addressing information of the source SGSN to an MSC. Further, the third sending unit 82 may be configured to send the addressing information of the source SGSN carried in a relocation required message or a direct transfer message to the MSC.

The apparatus 50 or 60 for determining a source SGSN may be an MSC, the apparatus 60 for determining a source SGSN may be a UE, and the apparatus 70 for determining a source SGSN may be an RNC.

Based on the above description, the apparatus for determining a source SGSN according to an embodiment of the present invention may ensure that an MSC obtains latest addressing information of a source SGSN of a UE, so that a target MME or a target SGSN obtains prepare bearer information of the UE from a correct source SGSN.

Persons of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, or a network device) or a processor (processor) to perform all or a part of steps of the methods described in the embodiments of the present invention. The storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for determining a source serving general packet radio service support node (SGSN), the method comprising:
    receiving, by a mobile switching center (MSC), a reverse single radio voice cell continuity (SRVCC) handover request;
    requesting, by the MSC, a user equipment (UE) to send address information of a source SGSN;
    obtaining, by the MSC, the addressing information of the source SGSN through a non-access stratum (NAS) message sent by the UE; and
    sending, by the MSC, the addressing information of the source SGSN to a target mobility management entity (MME) or a target SGSN, so that the target MME or the target SGSN determines the source SGSN according to the addressing information of the source SGSN.

2. The method according to claim 1, wherein the addressing information of the source SGSN comprises at least one of:
    a network resource identifier (NRI), a packet temporary mobile subscriber identity (P-TMSI), a routing area identifier (RAI), a routing area code (RAC), a global core network identifier, and an internet protocol (IP) address of the source SGSN in a core network (CN).

3. A method for determining a source serving general packet radio service support node (SGSN), the method comprising:
    receiving, by a user equipment (UE), a report request for sending address information of a source SGSN, wherein the report request is sent by a mobile switching center (MSC) after a reverse single radio voice cell continuity (SRVCC) handover request is received by the MSC;
    obtaining, by the UE, the addressing information of the source SGSN; and
    sending, by the UE, the addressing information of the source SGSN to the MSC through a non-access spectrum (NAS) message.

4. The method according to claim 3, wherein the addressing information of the source SGSN comprises at least one of:
    a network resource identifier (NRI), a packet temporary mobile subscriber identity (P-TMSI), a routing area identifier (RAI), a routing area code (RAC), a global core network identifier, and an internet protocol (IP) address of the source SGSN in a core network (CN).

5. An apparatus for determining a source serving general packet radio service support node (SGSN), the apparatus comprising:
    a communication interface coupled to at least one processor and configured to receive a reverse single radio voice cell continuity (SRVCC) handover request;
    the at least one processor configured to request a user equipment (UE) to send the addressing information of the source SGSN, and obtain the addressing information of the source SGSN through a non-access stratum (NAS) message sent by the UE; and
    the communication interface further configured to send the addressing information of the source SGSN to a target mobility management entity (MME) or a target SGSN, so that the target MME or the target SGSN determines the source SGSN according to the addressing information of the source SGSN.

6. The apparatus according to claim 5, wherein the addressing information of the source SGSN comprises at least one of:
    a network resource identifier (NRI), a packet temporary mobile subscriber identity (P-TMSI), a routing area identifier (RAI), a routing area code (RAC), a global core network identifier, and an internet protocol (IP) address of the source SGSN in a core network (CN).

7. An apparatus for determining a source serving general packet radio service support node (SGSN), the apparatus comprising:
    a receiver, configured to receive a report request for sending the addressing information of the source SGSN, wherein the report request is sent by a mobile switching center (MSC) after a reverse single radio voice cell continuity (SRVCC) handover request is received by the MSC;
    at least one processor, configured to obtain the addressing information of the source SGSN; and a sender, configured to send the addressing information of the source SGSN to the MSC through a non-access spectrum (NAS) message.

8. The apparatus according to claim 7, wherein the addressing information of the source SGSN comprises at least one of:

a network resource identifier (NRI), a packet temporary mobile subscriber identity (P-TMSI), a routing area identifier (RAI), a routing area code (RAC), a global core network identifier, and an internet protocol (IP) address of the source SGSN in a core network (CN).

* * * * *